(12) United States Patent
Hesse et al.

(10) Patent No.: US 8,006,722 B2
(45) Date of Patent: Aug. 30, 2011

(54) PIPELINE FOR CONDUCTING AIR FOR AIR CONDITIONING IN AIRCRAFTS

(75) Inventors: Karsten Hesse, Bremen (DE);
Heinz-Peter Busch, Weyhe (DE);
Hans-Jürgen Schelling, Oldenburg (DE)

(73) Assignee: Airbus Deutschland GmbH, Hamburg (DE)

( * ) Notice: Subject to any disclaimer, the term of this patent is extended or adjusted under 35 U.S.C. 154(b) by 786 days.

(21) Appl. No.: 11/914,177

(22) PCT Filed: May 15, 2006

(86) PCT No.: PCT/EP2006/004575
§ 371 (c)(1),
(2), (4) Date: May 5, 2008

(87) PCT Pub. No.: WO2006/120032
PCT Pub. Date: Nov. 16, 2006

(65) Prior Publication Data
US 2009/0260706 A1    Oct. 22, 2009

(30) Foreign Application Priority Data
May 13, 2005  (DE) .......................... 10 2005 023 148

(51) Int. Cl.
*F16L 11/00* (2006.01)
(52) U.S. Cl. .......................... 138/129; 138/130; 138/144
(58) Field of Classification Search .................. 138/137, 138/140, 141, 129, 130
See application file for complete search history.

(56) References Cited

U.S. PATENT DOCUMENTS

| | | | | | |
|---|---|---|---|---|---|
| 532,902 A | * | 1/1895 | Palmer | ........................... | 428/113 |
| 708,466 A | * | 9/1902 | Stowe | ........................... | 301/132 |
| 790,906 A | * | 5/1905 | Marks | ........................... | 152/556 |
| 1,425,148 A | * | 8/1922 | Subers | ........................... | 138/39 |
| 2,782,805 A | | 2/1957 | Leadbetter | | |
| 2,969,812 A | * | 1/1961 | De Ganahl | ................... | 285/238 |

(Continued)

FOREIGN PATENT DOCUMENTS
DE    1033973    7/1958
(Continued)

OTHER PUBLICATIONS

English-language translation of Chinese Patent Office Action during prosecution of Chinese national phase of Application No. 2006800163746, Jul. 25, 2008.

(Continued)

*Primary Examiner* — Patrick F Brinson
(74) *Attorney, Agent, or Firm* — Wood, Herron & Evans, LLP (57) ABSTRACT

A pipeline for conducting air for air conditioning in aircrafts includes a body portion formed with foamed plastics material or with a dense plastics material. The body portion defines a longitudinal axis and includes an outer surface carrying a wrapping for reinforcing the pipeline. The wrapping includes a plurality of adjacent contacting layers formed by at least one linear reinforcing element wound into a plurality of windings, with adjacent layers having windings angled in opposite directions to form a net-like structure of the wrapping. At least one of the spacing between the windings along the longitudinal axis or the angle of slope between the windings and the longitudinal axis varies in certain sections to change the winding density as a function of local mechanical load requirements on the pipeline.

15 Claims, 3 Drawing Sheets

U.S. PATENT DOCUMENTS

| | | | | |
|---|---|---|---|---|
| 3,483,896 | A | | 12/1969 | Grosh |
| 3,868,974 | A | * | 3/1975 | Ball ............................ 138/129 |
| 4,138,503 | A | * | 2/1979 | Ziolko ......................... 426/514 |
| 6,237,642 | B1 | * | 5/2001 | Lepoutre ...................... 138/129 |
| 6,659,136 | B2 | * | 12/2003 | Fukui et al. .................. 138/125 |
| 6,688,339 | B2 | * | 2/2004 | Yamaguchi et al. .......... 138/129 |

FOREIGN PATENT DOCUMENTS

| | | |
|---|---|---|
| DE | 10351398 | 5/2004 |
| EP | 0361580 | 4/1990 |
| FR | 2498980 A1 | 8/1982 |
| FR | 2554204 | 5/1985 |
| FR | 2869384 | 10/2005 |
| GB | 935885 | 9/1963 |

OTHER PUBLICATIONS

English-language translation of Chinese Patent Office Action, dated Jun. 26, 2009, during prosecution of corresponding Chinese Patent Application No. 2006800163746, supplying concise explanation of Foreign Patent Document No. 1, listed above.

* cited by examiner

PIPELINE FOR CONDUCTING AIR FOR AIR CONDITIONING IN AIRCRAFTS

This application claims the benefit of International Application No. PCT/EP2006/004575, filed on May 15, 2006, and German Application No. 10 2005 023 148.9, filed on May 13, 2005.

TECHNICAL FIELD

The invention relates to a pipeline for conducting air, in particular in a temperature range between −55° C. and +85° C. and at a differential pressure load of at most ±500 hPa relative to cabin pressure, for air conditioning in aircrafts.

BACKGROUND

Known embodiments of pipelines for air conditioning the interiors of passenger cabins in aircrafts are hardened for example with curable glass fiber-reinforced semi-finished products made of phenolic resin ("prepregs") in half-shell clamping or in low-pressure tubular construction to form half-shells or complete pipes with a finite length. In the half-shell clamping form of construction two respective half-shells still have to be glued together in a further manufacturing step to form complete pipes. To attain the required air tightness the outer faces of the pipes are also provided with a coating if required.

The pipes are subsequently encased with a thermal insulation made of polyimide foam, polyethylene foam or the like as a function of the respective application and the site of installation.

Owing to the reductions in weight that are constantly sought in aviation it is necessary to reduce the wall thickness of the pipes, so when laid in confined conditions and during operation the pipes often bend whereby proper air throughput is no longer provided.

The object of the invention is to create a pipeline which, compared with the known pipelines for air conditioning pressure ventilated interiors of passenger cabins of aircrafts, has a low weight and in addition has a partially more loadable reinforcement in sections at risk of buckling or sections that are more highly loaded mechanically, so in particular collapse during installation and/or operation is avoided as far as possible.

SUMMARY OF THE INVENTION

This object is achieved by a device with the features described below.

As a result of the fact that the pipeline is formed with a foamed plastics material and/or with a dense plastics material, one outer face of the pipeline and/or one inner face of the pipeline comprising a wrapping with at least one linear reinforcing element for reinforcement, at least in certain sections, the pipeline according to the s invention has a low weight while having a high level of security against buckling, or flexural strength, in all sections of the pipeline. Furthermore, the use of a foamed plastics material for forming the pipeline renders additional encasing of the pipeline with a suitable insulation material to reduce thermal losses dispensable as the foamed plastics material assumes the function of thermal insulation in addition to the air conduction function. When using the dense plastics material, for example in the form of a thin plastic film or the like, there is, by contrast, no appreciable thermal insulation capacity. The possibility of variation, in certain sections, of the mechanical loading capacity of the reinforcement by means of a change in the "winding density" of the wrapping means that the pipeline according to the invention can be optimally adjusted to different local loading requirements along the section for laying, resulting in a potentially considerable reduction in weight.

According to the invention, the wrapping for reinforcing the pipeline is formed with a plurality of layers, the layers having a large number of windings wound in the same direction in each case. Wrapping the pipeline with a plurality of layers allows construction of a wrapping with relatively high mechanical strengths. Further, layers located one above the other comprise windings wound in opposite directions to form a net-like structure of the wrapping. As a result the wrapping is given an overall net-like structure which ensures a good bond between the individual layers wound onto the outer face of the pipeline. A spacing between the windings and/or an angle of slope between the windings and a pipeline longitudinal axis varies/vary in certain sections to change the winding density as a function of local mechanical load requirements of the pipeline. Owing to the variation, in certain sections, in the spacing of the windings from each other and/or angles of slope or "winding density" of the wrapping, the mechanical loading capacity of the pipeline according to the invention may be optimally adjusted in certain sections to the respective requirements, resulting in a considerable reduction in weight. If, for example, the spacing of the windings from each other are reduced, the relevant section of the pipeline becomes more resistant to bending and thus more secure against buckling. This embodiment can be advantageous for example in sections for laying which require narrow pipeline radii of curvature. In contrast the reinforcement formed by the wrapping can turn out to be weaker in straight sections of the pipeline for laying, and this can be achieved by increasing the spacing of the windings from each other and/or increasing the angle of slope, i.e. overall by a reduction in the winding density. As a result the flexural strength of the pipeline is definedly reduced, so as a consequence of the increased flexibility tolerance compensation and assembly of the pipeline for example are facilitated. The reinforcement in straight sections of the pipeline for laying can optionally also be dispensed with entirely. The linear reinforcing elements for forming the windings are formed with at least one continuous fiber which is enclosed by a matrix made of a thermosetting plastics material and/or a matrix made of a thermoplastic polymer. This results in a reinforcement which is highly mechanically loadable yet lightweight and which can be simply applied, at least in certain sections, by wrapping the outer face of the pipeline and/or the inner face of the pipeline.

According to a further advantageous configuration of the pipeline according to the invention, to minimise flow losses, the inner face of the pipeline is constructed so as to be substantially smooth. This configuration ensures minimal flow resistance in the pipeline.

In accordance with a further advantageous configuration the pipeline is formed with at least one rolled-up portion of the foamed plastics material and/or the dense plastics material. Consequently, starting from a panel-like material, the pipeline according to the invention can be formed simply and so as to save costs. For this purpose, portions of material are formed from the panel-like material and are rolled up or rolled to form a pipeline. The opposing longitudinal sides of the portion of material are securely joined together to form the pipeline.

According to a further advantageous configuration in each case two of the mutually abutting longitudinal sides of the rolled-up portion or portions of material are constructed so they can be joined together by means of a connecting element in order to form the pipeline. The connecting element, which is preferably formed as a quick acting closure, allows quick and simple production of the pipeline by joining the longitudinal sides of the panel-like portion of material after rolling up. By introducing a sealant into the connecting element virtually complete air tightness of the pipeline may be produced along the thus formed longitudinal seam.

A further advantageous configuration provides that, for forming the pipeline, the respectively abutting longitudinal sides of the rolled-up portion or portions of material are constructed so they can be securely joined together, in particular can be glued or welded to each other. This results in a simpler pipeline construction which manages without an additional connecting element at the longitudinal sides of the portion of material.

In accordance with a further advantageous configuration, the pipeline is seamlessly formed with at least one strand of the foamed plastics material and/or of the dense plastics material. This variant allows production of pipelines of virtually any desired length by means of known plastics material extrusion methods.

According to a further advantageous configuration the inner face of the pipeline and/or the outer face of the pipeline comprise(s) an additional sealing layer to improve the air tightness. Consequently any air losses owing to leaks in the region of the material wall of the pipeline are reduced, so overall only a very slight drop in pressure results along the pipeline.

BRIEF DESCRIPTION OF THE DRAWINGS

Further advantageous configurations of the arrangement are illustrated in the drawings.

In the figures identical constructional elements are in each case provided with the same reference numerals.

DETAILED DESCRIPTION

Figure 1:
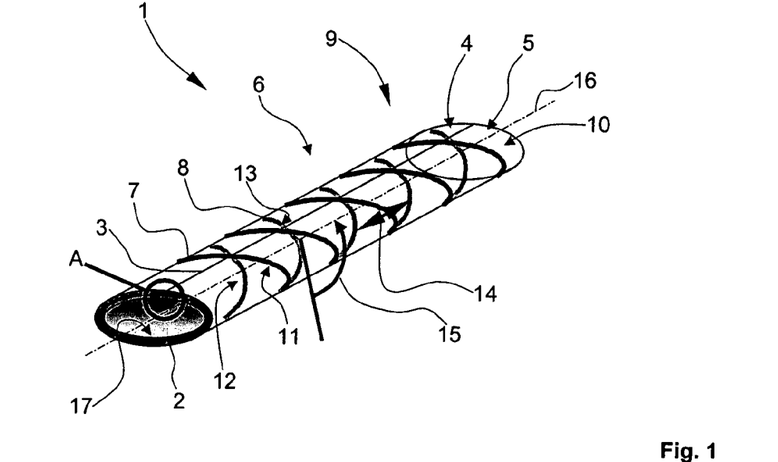
FIG. 1 shows a perspective view of the pipeline of the invention according to a first embodiment.

FIG. 1 shows a perspective view of the pipeline according to the invention, in particular for conducting air for air conditioning pressure ventilated interiors of passenger cabins of aircrafts, according to a first embodiment.

The pipeline 1 is formed with a rolled-up portion of material 2 of which the longitudinal sides 4, 5 mutually abutting in the region of a longitudinal seam 3 are joined together so as to be airtight. The portion of material 2 is preferably formed with a closed-cell thermoplastic foamed plastics material, such as a polyimide foam, a polyethylene foam or the like. The thickness of the portion of material 2 depends in particular on the heat transfer coefficient of the foamed plastics material used and the required thermal insulation capacity and is preferably less than 100 mm. The thickness of the portion of material 2 can therefore be varied within wide limits and can also vary in certain sections. As a consequence of rolling-up or bending the portion of material 2, the pipeline 1 has an approximately circular, oval or elliptical cross-sectional geometry.

The foamed plastics material used for the portion of material 2 means a good thermal insulation capacity of the pipeline 1 is attained on the one hand and, on the other hand, the foamed plastics material assumes the conducting function for the air in the pipeline 1 and provides generally adequate mechanical stability, at least in straight sections of the pipeline 1 for laying. The simultaneous assumption of the insulation function and the conducting function for the air by the portion of material 2 results, with the pipeline 1 according to the invention, in a reduction in material accompanied by a considerable reduction in weight.

If the thermal insulation capacity of the pipeline 1 is of only secondary importance in a specific embodiment the portion of material 2 can be formed with a dense plastics material, for example with a thermoplastic polymer and/or with a thermosetting plastics material with sufficient material thickness. The term "dense" plastics material means that, in contrast to a foamed plastics material, there are substantially no cavities in the material. As a result embedding of reinforcing fibers, for example in the form of carbon fibers or glass fibers, is not ruled out.

To improve mechanical stability the pipeline 1 has a wrapping 6. In the illustrated embodiment the wrapping 6 is formed with two continuous fibers 7, 8 as linear reinforcing elements which are each wound spirally and in opposite directions onto an outer face 9 of the pipeline. For stabilization the continuous fibers 7, 8 are embedded or preferably enclosed on all sides in a matrix made of curable thermosetting plastics material, for example an epoxy resin or a phenolic resin. The continuous fiber 7 hereby forms a layer 10 with a large number of windings, of which only one winding 11 is provided with a reference numeral for a better overview of the drawing. The continuous fiber 8 accordingly forms a layer 12, resting directly below the layer 10 in a radial direction, with a large number of windings, of which likewise only one winding 13 is provided with a reference numeral. The layers 10, 12 are located one on top of the other such that the contacting layers 10, 12 have respective windings with opposite winding directions so the wrapping 6 is given an overall net-like structure with a good bond between the layers 10, 12.

The continuous fibers 7, 8 can be formed with ceramic, aramide, glass or carbon fibers. It is conceivable here for the continuous fibers 7, 8 to also be formed with bundles with a plurality of said fibers or with hybrids of said fibers. Alternatively continuous fibers 7, 8 made of a thermoplastic polymer and/or thermosetting plastics material can also be used. To improve the mechanical stability of the continuous fibers 7, 8 they may be embedded in a matrix made of a thermoplastic polymer and/or a curable thermosetting material, for example epoxy resin or phenolic resin.

In sections of the pipeline 1 that are at risk of bending, i.e. for example in sections for laying with relatively small radii of curvature or other external mechanical loads, the net-like wrapping 6 formed from at least one layer has a higher "winding density". An increase in the winding density means that an angle of slope 15, which is determined for example between the winding 13 of the continuous fiber 8 and a longitudinal axis 16 of the pipeline, and/or a spacing 14 between two windings of one of the continuous fibers 7, 8, is reduced.

Conversely, the relevant spacing or angles of slope of the wrapping 6 increase with a lower winding density. The winding density of the wrapping 6 can vary, in certain sections, along the longitudinal axis 16 of the pipeline, for example for adjustment to local mechanical loading requirements. The increase or reduction in the winding density of the wrapping 6 results in a "mesh size" of the net-like wrapping 6 formed from the two layers 10, 12 being changed.

In sections of the pipeline 1 for laying which are at risk of bending the winding density of the wrapping 6 can be increased to the extent that a bend in the pipeline 1 is virtually ruled out under all mechanical loads that normally occur. In this case the pipeline 1 according to the invention corresponds to a conventional pipe with a high wall thickness. In straight sections of the pipeline 1 for laying on the other hand, the winding density of the wrapping 6 can be much reduced, resulting in considerable reductions in weight.

Alternatively it is also possible to separate the continuous fibers 7, 8 at the start of a straight section for laying and to only begin wrapping again by way of newly placed continuous fibers at the start of a curved section for laying. It is also possible to wrap the pipeline 1, in opposing directions in each case, with more than the illustrated two continuous fibers 7, 8, resulting in a plurality of layers of continuous fibers located one above the other in contacting engagement.

The fact that the winding density of the wrapping 6 or the mesh size of the net-like wrapping 6 formed therefrom can, in certain sections, be definedly changed as a function of the locally occurring loads results in a considerable potential weight reduction by means of the pipeline 1 according to the invention. In addition the flexibility of the pipeline may, in certain sections, be adjusted to the local installation conditions, so assembly is considerably simplified.

To minimize the flow resistance of the pipeline 1 the inner face 17 thereof is preferably constructed so as to be smooth. In portions of material 2 which are formed with thermoplastic polymer materials, for example, smoothing of the inner face 17 of the pipeline can take place by way of what is known as "hardening", i.e. thermal treatment. Alternatively the inner face 17 of the pipeline may also be provided or coated with a sealing layer, in particular a paint or resin layer.

In contrast to the illustration of the embodiment of FIG. 1, the pipeline 1 can comprise an inner wrapping (not shown) formed in accordance with the wrapping 6 and arranged on the inner face 17 of the pipeline. This inner wrapping that is applied at least in certain sections can be provided instead of the wrapping 6 or in addition thereto. The inner wrapping prevents buckling of the pipeline 1, for example in the event that the atmospheric pressure of the pipeline 1 is higher than the pressure inside the pipeline 1. If the pressure inside the pipeline 1 is higher than the external pressure in any operating state in a specific application generally only the outer wrapping 6 is necessary to absorb the forces that occur.

The pipeline according to the invention is provided hereby for air conduction in a temperature range of −55° C. to +85° C. The pipeline 1 is limited hereby to applications in which the differential pressure load is at most ±500 hPa relative to the cabin pressure. This means that the difference between the pressure in the pipeline and the pressure outside the pipeline 1 is at most ±500 hPa in all conceivable operating states. In normal operation the pressure in the pipeline 1 is usually higher than outside the pipeline, so positive differential pressures are established. In certain dynamic operating states the pressure in the pipeline 1 can be lower than the pressure prevailing outside the pipeline 1, so negative differential pressures occur. Negative differential pressures of this type can also occur with a pipeline 1 which is used, for example, for suction filtering stale air or the like.

To provide the inner face 17 of the pipeline with an inner wrapping of this type the inner wrapping is firstly provided on a winding element, for example a mandrel or the like. The inner wrapping on the winding element is formed in the same manner as the wrapping 6 described above on the outer face 9 of the pipeline and has a corresponding construction with an identical structure. The portion of material 2 is then placed around the mandrel with the inner wrapping and joined at the longitudinal sides 4, 5. The mandrel can then be removed. In accordance with the above statements the outer wrapping 6 is, if necessary, subsequently applied to the outer face 9 of the pipeline formed by the portion of material 2. The mandrel can also remain inside the pipeline 1 until the outer wrapping 6 is finished.

Figures 2, 3:
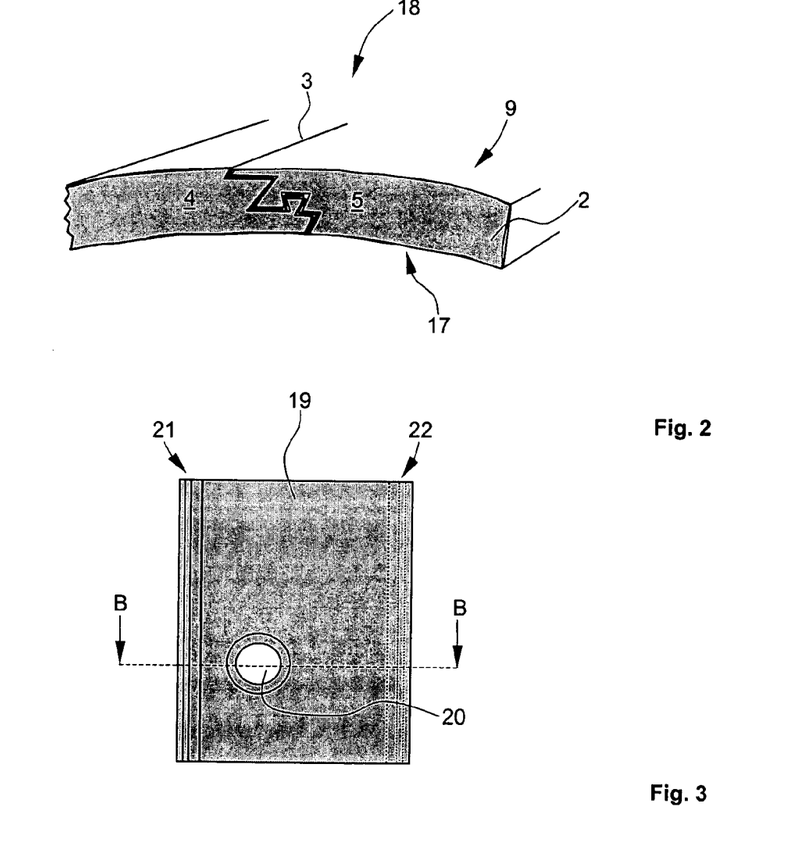
FIG. 2 shows an enlarged detail A from FIG. 1.
FIG. 3 shows a portion of material for forming the pipeline in the first embodiment with an optional recess for integration of a junction.

FIG. 2 shows the detail A from FIG. 1 in an enlarged illustration.

The portion of material 2 comprises the two longitudinal sides 4, 5. To join the longitudinal sides 4, 5, which mutually abut at the end face, in the region of the longitudinal seam 3, a large number of meshing grooves and tongues are introduced into the longitudinal sides 4, 5 to form a linear connecting element 18 as a quick acting closure. The connecting element 18 is in this case preferably constructed so it can be released many times.

After the actual production process of the portion of material 2, for example by milling or the like, the grooves and tongues can be introduced therein. Alternatively the flat portion of material 2 can be produced by means of known plastics material extrusion methods with the grooves and tongues being co-formed in the same manner by appropriate configuration of the nozzle geometry.

Instead of joining the longitudinal sides 4, 5 shown by way of example in FIG. 2 by trapezoidally formed grooves or tongues, which can, at least in certain regions, be introduced into each other with interlocking fit, other developments of quick acting closures, such as pressure locks, hook and loop-type fasteners, etc., can be used. To increase the tightness of the pipeline 1 it may also be necessary to provide the connecting element 18 with additional sealants, for example by painting over a plastics material.

In contrast to the illustrated configuration of the connecting element 18 as a releasable quick acting closure the longitudinal sides 4, 5 can also be securely, i.e. non-releasably under normal operating conditions, joined together by a glued or welded joint.

So the outer face 9 and the inner face 17 of the pipeline form a substantially continuous smooth surface in the region of the longitudinal seam 3, mutually overlapping overlaps are arranged at the longitudinal sides 4, 5.

FIG. 3 shows a portion of material in the flat, i.e. unrolled, position for forming a pipeline according to the first embodiment.

A flat or panel-like portion of material 19 used for forming the pipeline 1 according to the invention has a substantially circular recess 20 to create a, particularly, T-shaped junction. In accordance with the illustration of FIGS. 1 and 2, the portion of material 19 is formed with a foamed plastics material. The portion of material 19 is rolled or curled up in accordance with the illustration of FIGS. 1 and 2 and, as described within the framework of the description of FIG. 2, is joined at the longitudinal sides 21, 22 to form the pipeline 1 by means of the connecting element 18 formed as a quick acting closure.

The grooves and tongues (cf. FIG. 2) for joining the longitudinal sides 21, 22 to form the pipeline 1 are indicated by parallel lines without reference numerals for a better overview of the drawings.

Figure 4:
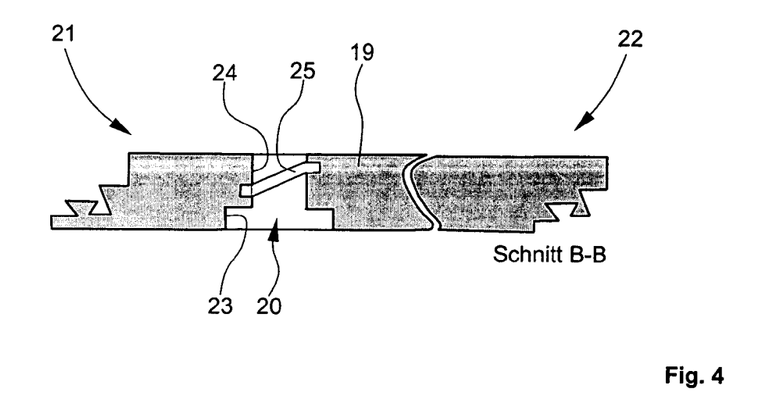
FIG. 4 shows a cross-section through the portion of material along the cutting line B-B of FIG. 3 for forming the pipeline according to the first embodiment.

FIG. 4 shows a cross-section through the portion of material along the cutting line B-B in FIG. 3.

To create a junction, the portion of material 19 comprises a recess 20. The longitudinal sides 21, 22 comprise grooves and tongues (not shown) for joining the longitudinal sides 21, 22 to form the pipeline according to the invention by rolling up the portion of material 19, which longitudinal sides are formed in accordance with the illustration in FIGS. 1 and 2.

A countersink 23 and a fastening hole 24 are introduced into the recess 20, for example by means of a stepped drill bit or the like. An internally threaded portion 25 is introduced into the portion of material 19 in the region of the countersink 23 and is used for fastening a junction piece (not shown in the illustration of FIG. 4) in the portion of material 19.

Figure 5:
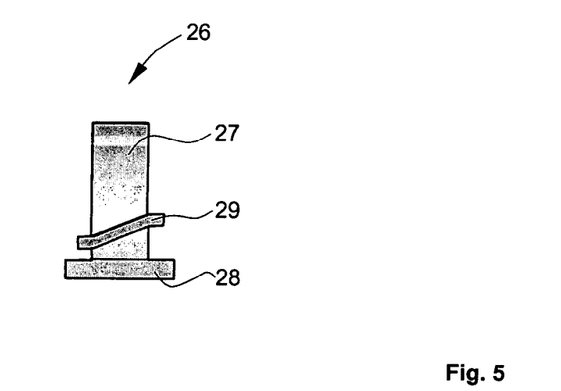
FIG. 5 shows a junction piece for integration in the pipeline according to the first embodiment.

FIG. 5 shows a junction piece for forming a preferably T-shaped junction of the pipeline according to the invention.

A junction piece 26 is substantially formed with a tubular portion 27 with a circular flange 28 being arranged at one end of the tubular portion 27. The flange 28 can preferably be introduced into the countersink 23 so as to be flush. The tubular portion 27 with a substantially hollow cylindrical cross-sectional geometry also comprises an externally threaded portion 29. The externally threaded portion 29 is formed so as to correspond with the internally threaded portion 25 in the portion of material 19, so the externally threaded portion 29 of the junction piece 26 can be introduced with interlocking fit, at least in certain regions, into the internally threaded portion 25 and the fastening hole 24 of the portion of material 19 by simple screwing into the portion of material 19 and can thus be fastened therein (cf. FIG. 4). In this case the junction piece 26 is constructed in such a way that a T-shaped junction is formed by screwing-in the connecting piece.

To increase the air tightness and the mechanical strength of the thus formed T-shaped junction it may be necessary to provide, at least in certain regions of the externally threaded portion 29 and/or the internally threaded portion 25, a sealant or adhesive.

Figure 6:
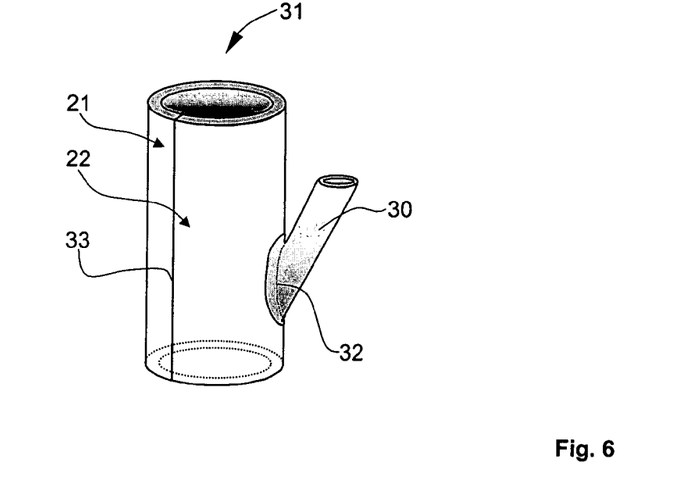
FIG. 6 shows a three-dimensional diagram of the pipeline of the invention according to the first embodiment with a V-junction.

FIG. 6 shows a V-shaped junction with a junction piece 30 which branches off a pipeline 31. In this case the junction piece 30 used for forming the V-shaped junction is again arranged in a recess 32 in the pipeline 31 and fastened therein (cf. FIGS. 4 and 5). In contrast to the recess 20 in FIG. 3, the recess 32 for forming a V-shaped junction has an elliptical geometry, so screwing-in of the connecting piece 30 is no longer possible. Instead the junction piece 30 must be pressed, glued, welded or otherwise fastened in the recess 32. The longitudinal sides 21, 22 of the portion of material 19 again abut each other in the region of a longitudinal seam 33 to form the pipeline 31.

Instead of using the panel-like portions of material 2, 19, formed using a foamed plastics material, as a starting material, the pipelines 1, 31 can also be seamlessly formed using known extrusion methods and can be formed in virtually any desired lengths.

Figure 7:
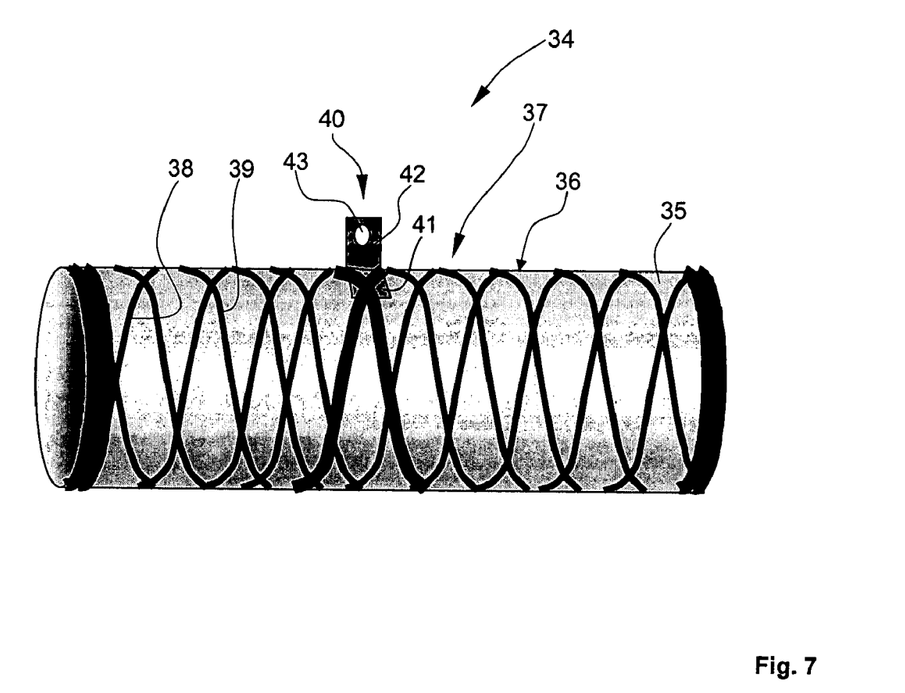
FIG. 7 shows a pipeline of the invention according to a second embodiment, and a holding device.

FIG. 7 shows a second embodiment of a pipeline 34 according to the invention.

In contrast to the first embodiment, the pipeline 34 is not formed with a foamed plastics material with sufficient material thickness but with a portion of material 35 made of a dense plastics material, in particular a thin-layer plastic film or the like. The plastic film can in this case be formed by a thermoplastic material which can optionally also have additional fiber reinforcement.

For mechanically reinforcing the pipeline 34 a wrapping 37 is again provided on an outer face 36 of the pipeline. The wrapping 37 is formed in accordance with the illustration of FIG. 2 with two continuous fibers 38, 39 which act as substantially linear reinforcing elements. The continuous fibers 38, 39 are wound here in opposite directions onto the outer face 36 of the pipeline 34. The wrapping 37 moreover has exactly the same construction and the same structure as the wrapping 6 in FIG. 1, so reference is made at this point to the part of the description relating to FIG. 1.

Reinforcement of the pipeline 34 with the wrapping 37 is generally always required in this embodiment as the pipeline 34 is merely formed with a portion of material 35 of a relatively thin plastic film by rolling up the portion of material 35. Accordingly the longitudinal sides of the portion of material 35 used for forming the pipeline 34 cannot be joined together by trapezoidal grooves or tongues, as illustrated in FIGS. 2 and 4. In this second embodiment of the pipeline 34 according to the invention it is imperative that both longitudinal sides of the portion of material 35 are securely joined together, for example by gluing or welding.

The pipeline 34 also comprises two end face reinforcing regions, preferably likewise formed from the continuous fibers 38, 39 and shown in the illustration of FIG. 7 by the greatest line widths. These reinforcing regions can for example be used to connect coupling sleeves, junction pieces or the like. The wrapping 37 can as a rule be provided only after an appropriate pretreatment of the outer face 36 of the pipeline. This is particularly the case if the continuous fibers 38, 39 are impregnated with a curable thermosetting plastics material, for example an epoxy resin or a phenolic resin, to form a matrix and the portion of material 35 is formed with a thermoplastic polymer. In the second embodiment of the pipeline 34 according to the invention the portion of material 35 can for example be formed with a plastic film made of polyetherimide (PEI), Tedlar (PVF), polyvinylidene fluoride (PVDF) or the like.

The pipeline 34 also comprises a holder 40 for fastening to further constructional elements, not shown, for example to reinforcing profiles in aircrafts fuselage cells or the like. The holder 40 has a base plate 41 which is wrapped by the continuous fibers 38, 39 for fastening. For connection to further constructional elements the base plate 41 has a fastening clip 42, arranged substantially at a right angle thereto, with a fastening hole 43. The winding density of the wrapping 37 is preferably increased in the region of the holder 40.

The second embodiment of the pipeline 34 according to the invention can also additionally or alternatively comprise, at least in certain sections, an inner wrapping for reinforcement, as has already been described within the framework of the description of FIG. 1.

Figure 8:
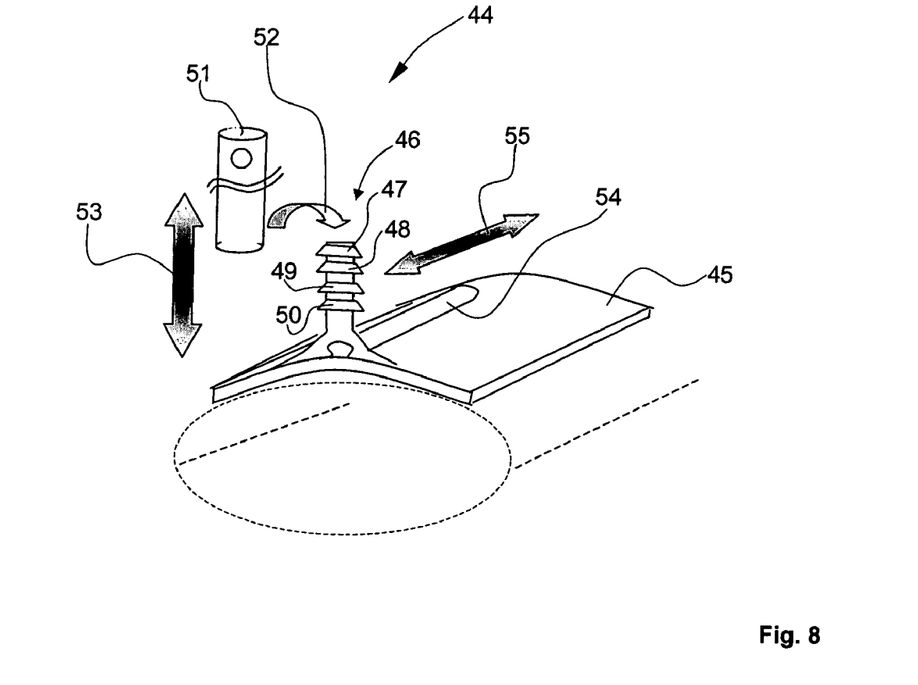
FIG. 8 shows an alternative embodiment of a holder for fastening the pipeline to further constructional elements.

FIG. 8 shows an alternative embodiment of a holder for fastening the pipeline to constructional elements.

A holder 44 firstly comprises a base plate 45. The base plate 45 is curved, with the curvature of the base plate 45 preferably being adapted to the surface curvature of the pipeline on which the holder 44 is to be fastened by wrapping with the continuous fibers of the wrapping. A shaft 46 with a plurality of latching noses 47 to 50 is arranged on the base plate 45. The latching noses 47 to 50 can be wholly or partially introduced into a connecting means 51 and latched thereto, as indicated by the arrow 52. The connecting means 51 that can be latched stepwise with the shaft 46 is used in particular to connect the holder 44 and thus the pipeline to be fastened to further constructional elements (not shown). For fixing the installation position the desired holder position can be permanently secured by means of adhesive or mechanically, for example by a locking pin or the like.

Owing to the at least four-stage latching capacity of the shaft 46 with the connecting means 51, the connecting means 51 can be adjusted in the direction of the arrow 53, so there is the possibility of tolerance compensation in this spatial direction during assembly.

The shaft 46 on the base plate 45 can moreover be continuously displaceably and simultaneously lockably received in the groove 54 in the direction of arrow 55 also, so there is the possibility or tolerance compensation in this direction as well. The capacity for tolerance compensation in the direction of arrows 53, 55 considerably simplifies assembly of the line according to the invention on further constructional elements (not shown) in an aircraft.

LIST OF REFERENCE NUMERALS 1 pipeline
2 portion of material
3 longitudinal seam
4 longitudinal side
5 longitudinal side
6 wrapping
7 continuous fiber
8 continuous fiber
9 outer face of pipeline
10 layer
11 winding
12 layer
13 winding
14 spacing
15 angle of slope
16 longitudinal axis of pipeline
17 inner face of pipeline
18 connecting element
19 portion of material
20 recess
21 longitudinal side
22 longitudinal side
23 countersink
24 fastening hole
25 internally threaded portion
26 junction piece
27 pipe section
28 flange
29 externally threaded portion
30 junction piece
31 pipeline
32 recess
33 longitudinal seam
34 pipeline
35 portion of material
36 outer face of pipeline
37 wrapping
38 continuous fiber
39 continuous fiber
40 holder
41 base plate
42 fastening clip
43 fastening hole
44 holder
45 base plate
46 shaft
47 latching nose
48 latching nose
49 latching nose
50 latching nose
51 connecting means
52 arrow
53 arrow
54 groove
55 arrow

The invention claimed is:

1. A pipeline for conducting air, in particular in a temperature range between −55° C. and +85° C. and at a differential pressure load of at most ±500 hPa relative to cabin pressure, for air conditioning in aircrafts, the pipeline comprising:
a body portion formed with foamed plastics material and/or with a dense plastics material, the body portion extending along a pipeline longitudinal axis and including an outer face and an inner face defining a closed cross-sectional geometry; and
a wrapping positioned on the outer face and/or the inner face, the wrapping including at least one linear reinforcing element, the wrapping including a plurality of layers located one above the other in contacting relationship, each layer including a plurality of windings wound in the same direction, wherein
the windings of adjacent layers are wound in opposite directions to form a net-like structure of the wrapping,
at least one of a spacing between the windings along the pipeline longitudinal axis and an angle of slope between the windings and the pipeline longitudinal axis varies in certain sections to change the winding density as a function of local mechanical load requirements of the pipeline, and
the linear reinforcing elements for forming the windings are formed with at least one continuous fiber which is enclosed by a matrix formed from at least one of a thermosetting plastics material and a thermoplastic polymer.

2. The pipeline of claim 1, wherein to minimize flow losses, the inner face of the pipeline is substantially smooth.

3. The pipeline of claim 1, wherein the body portion of the pipeline is formed with at least one rolled-up portion of material of the foamed plastics material and/or the dense plastics material.

4. The pipeline of claim 3, wherein each rolled-up portion of material includes two mutually abutting longitudinal sides adapted to be joined together by a connecting element in order to form the body portion of the pipeline.

5. The pipeline of claim 4, wherein the respectively abutting longitudinal sides of the rolled-up portion are glued or welded to each other.

6. The pipeline of claim 1, wherein the body portion of the pipeline is seamlessly formed with at least one strand of the foamed plastics material and/or of the dense plastics material.

7. The pipeline of claim 1, wherein at least one of the inner face and the outer face comprises an additional sealing layer to improve the air tightness.

8. The pipeline of claim 1, wherein the body portion has a thickness dependent on a predetermined heat transfer coefficient.

9. The pipeline of claim 1, wherein the body portion has a thickness of less than 0.5 millimeters.

10. The pipeline of claim 1, wherein the foamed plastics material is at least one of a thermosetting plastics material and a thermoplastic polymer.

11. The pipeline of claim 1, wherein the dense plastics material is at least one of a thermosetting plastics material and a thermoplastic polymer.

12. The pipeline of claim 1, wherein the dense plastics material has fiber reinforcement.

13. An aircraft including a pipeline for conducting air, in particular in a temperature range between −55° C. and +85° C. and at a differential pressure load of at most ±500 hPa relative to cabin pressure, for air conditioning, the pipeline comprising:
- a body portion formed with a foamed plastics material or with a dense plastics material and including an outer face and an inner face, at least one of the outer face and the inner face provided with a wrapping for reinforcing the pipeline, the wrapping including a plurality of layers in adjacent contacting relationship wherein each layer has a plurality of windings formed by at least one continuous fiber and wound in the same direction, and wherein the windings of adjacent contacting layers located one above the other are wound in opposite directions to form a net-like structure of the wrapping,
- wherein the continuous fibers for forming the windings of the layers are enclosed by a matrix made of a thermosetting plastics material or a matrix made of a thermoplastic polymer, and
- at least one of a spacing between the windings and an angle of slope between the windings and a pipeline longitudinal axis varies along the pipeline longitudinal axis to change the winding density along the pipeline longitudinal axis as a function of local mechanical load requirements of the pipeline.

14. The pipeline of claim 10, wherein the foamed plastics material is at least one of a polyimide foam and a polyethylene foam.

15. The pipeline of claim 11, wherein the dense plastics material is a film made of polyvinylidene fluoride (PVDF) or another high temperature-resistant material.

* * * * *